US005452913A

United States Patent [19]
Hansen et al.

[11] Patent Number: 5,452,913
[45] Date of Patent: Sep. 26, 1995

[54] BREAK-AWAY AIRBAG RETAINING FLAP

[75] Inventors: Scott L. Hansen, Huntsville; Kurt E. Kottke, Bountiful, both of Utah; Makoto Kan, Wako, Japan; Hitoshi Higuchi, Wako, Japan; Iwao Imaizumi, Wako, Japan

[73] Assignees: Morton International, Inc., Chicago, Ill.; Honda Giken Kogyo Kabushiki Kaisha, Tokyo, Japan

[21] Appl. No.: 115,157

[22] Filed: Aug. 31, 1993

[51] Int. Cl.$^6$ ................................................ B60R 21/16
[52] U.S. Cl. ................................... 280/728.1; 280/732
[58] Field of Search .................. 280/728 R, 732, 280/731, 743 R, 740, 741, 742, 736, 728.1, 743.1

[56] References Cited

U.S. PATENT DOCUMENTS

| | | | |
|---|---|---|---|
| 4,842,300 | 6/1989 | Ziomek et al. | 280/743 A |
| 4,964,654 | 10/1990 | Bishop et al. | 280/728.2 |
| 5,004,266 | 4/1991 | Miller et al. | 280/743 A |
| 5,084,122 | 1/1992 | Fukushima et al. | 280/731 |
| 5,121,941 | 6/1992 | Mihm et al. | 280/732 |
| 5,195,775 | 3/1993 | Komerska et al. | 280/728 A |
| 5,211,421 | 5/1993 | Catron et al. | 280/732 |
| 5,234,227 | 8/1993 | Webber | 280/732 |
| 5,255,937 | 10/1993 | Emain Bakhsh et al. | 280/728 A |
| 5,303,951 | 4/1994 | Goestenkors et al. | 280/728.3 |
| 5,326,131 | 7/1994 | Yokota et al. | 280/728 A |

FOREIGN PATENT DOCUMENTS

| | | | |
|---|---|---|---|
| 0415362 | 3/1991 | European Pat. Off. | |
| 0489174 | 6/1992 | European Pat. Off. | |
| 4137691 | 11/1992 | Germany | 280/743 R |
| 0146840 | 5/1992 | Japan | 280/743 R |

Primary Examiner—Margaret A. Focarino
Assistant Examiner—Paul N. Dickson
Attorney, Agent, or Firm—Mason, Kolehmainen, Rathburn & Wyss

[57] ABSTRACT

A break-away retaining flap for containing a deflated, folded-up airbag in a rigid housing of an airbag module while a pivotable cover is attached with fasteners to close an open end of the housing comprises a sheet of thin flexible woven fabric material having a first portion designed for attachment to the housing on a line spaced away from the open end and a second portion adapted to be secured onto a row of fasteners adjacent the open end of the housing while the cover is attached. The retaining flap holds the folded-up airbag in place in the housing during the assembly process and prevents crimping, binding or damage when the cover is installed at final assembly. The retaining flap has a weakened portion intermediately between the first and second attached portions defining a tear-away line adapted to facilitate break-away of the retaining flap into at least two parts when the airbag is inflated without impeding the rapid inflation of the airbag during deployment.

23 Claims, 3 Drawing Sheets

BREAK-AWAY AIRBAG RETAINING FLAP

BACKGROUND OF THE INVENTION

1. Field of the Invention

The present invention relates generally to inflatable airbags utilized in motor vehicles and the like and more particularly relates to a modular airbag inflator assembly adapted to be mounted on the passenger side of vehicle for protection of a passenger by inflation of the airbag when a crash or collision occurs or is eminent.

The present invention relates to a new and improved break-away retaining flap for holding and protecting an airbag while in a deflated folded-up condition within a rigid housing during and after assembly and attachment of a cover to the housing which is designed to tear and pivot open to release the inflating airbag. The break-away retaining flap of the present invention is especially designed for use in an Inflatable Airbag Module of the type shown and described in copending U.S. patent application Ser. No. 08/101,617, filed Aug. 3, 1993, and is especially designed to be used with a Cover For An Inflatable Airbag Housing shown and described in copending U.S. patent application Ser. No. 08/101/609, filed Aug. 3, 1993, both of said copending U.S. patent applications being hereby incorporated by reference herein.

2. Background of the Prior Art

One of the problems encountered in the assembly of components into an inflatable airbag module assembly is in maintaining the deflated airbag in a proper folded-up condition after placement in a rigid housing of the module so that the airbag does not get pinched or damaged when the cover is installed in place.

In addition, it is desirable to protect the airbag after assembly of the airbag module has been completed against damage from unwanted contact with the cover and inside wall surfaces of the housing of the module.

However, any system for protecting the airbag during and after placement of the airbag into a rigid housing and attachment of the cover to the module as a final assembly step should not restrict or impede the rapid inflation of the airbag when deployed.

OBJECTS OF THE INVENTION

Accordingly, it is an object of the present invention to provide a new and improved modular, inflatable airbag assembly.

It is another object of the present invention to provide a new and improved break-away airbag retaining flap for holding and protecting an airbag in a deflated, folded-up condition in a rigid housing against pinching, binding or other damage during and after a final assembly process has taken place.

It is yet another object of the present invention to provide a new and improved method of assembling a deflated, folded-up airbag into a rigid housing of an airbag inflator module in a manner insuring protection of the airbag from pinching, binding or other damage during and after assembly of the cover on the housing.

It is still another object of the present invention to provide a new and improved modular inflatable airbag assembly having an airbag retaining flap for facilitating the assembly process which does not impede or restrict the inflation of the airbag during rapid deployment.

Still another object of the present invention is to provide a new and improved modular inflatable airbag assembly having an airbag retaining flap which is adapted to tear apart along a predetermined weakened area as the airbag is rapidly inflated.

Yet another object of the present invention is to provide a new and improved modular inflatable airbag assembly having a break-away airbag retaining flap which is strong enough to retain and protect an airbag in a deflated folded-up condition in a modular housing yet easily fractured by inflation of the airbag during deployment.

Still another object of the present invention is to provide a new and improved modular inflatable airbag assembly having a break-away airbag retaining flap of flexible sheet material which is relatively low in cost, easy to assemble, simple and reliable in operation and which functions to protect an adjacent instrument panel from friction damage during airbag deployment.

BRIEF SUMMARY OF THE PRESENT INVENTION

The foregoing and other objects and advantages of the present invention are accomplished in a new and improved break-away type airbag retaining flap for containing and protecting an airbag within a rigid housing of an airbag inflator module while the airbag is in a deflated folded-up condition so that airbag damage from pinching, binding or other unwanted contact with component parts of the airbag module does not occur during initial assembly of the airbag module and thereafter. An airbag retaining flap in accordance with features of the present invention comprises a piece of thin flexible, strong, sheet material such as a fabric of woven Nylon$_R$ resinous strands having an edge portion which is attached to a rigid housing wall of the module housing along a line spaced away from an open end of the housing. An edge of the airbag placed in the housing in a deflated folded-up condition is also attached along the same line at this time. The retaining flap is then extended from the attached edge portion to a position covering over and protecting the folded-up airbag. An opposite edge of the retaining flap is then secured by fasteners on the housing adjacent the open end to seal off and enclose the deflated airbag therein. Subsequently, a cover for the module is attached to the housing utilizing the same fasteners and is positioned to extend over the retaining flap already in place, so that no pinching, binding or other damage to the airbag itself results because of unwanted contact with the cover or housing wall portion during assembly or thereafter.

Intermediately between the attached edges of the flexible break-away retaining flap, a row or line of perforations or indentations is provided to weaken the fabric along a tear line or break-away line so that when the airbag is inflated with expanding gas, the retaining flap is readily severed into two parts along the tear line with little or no impedance to the rapid inflation of the airbag.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 1:
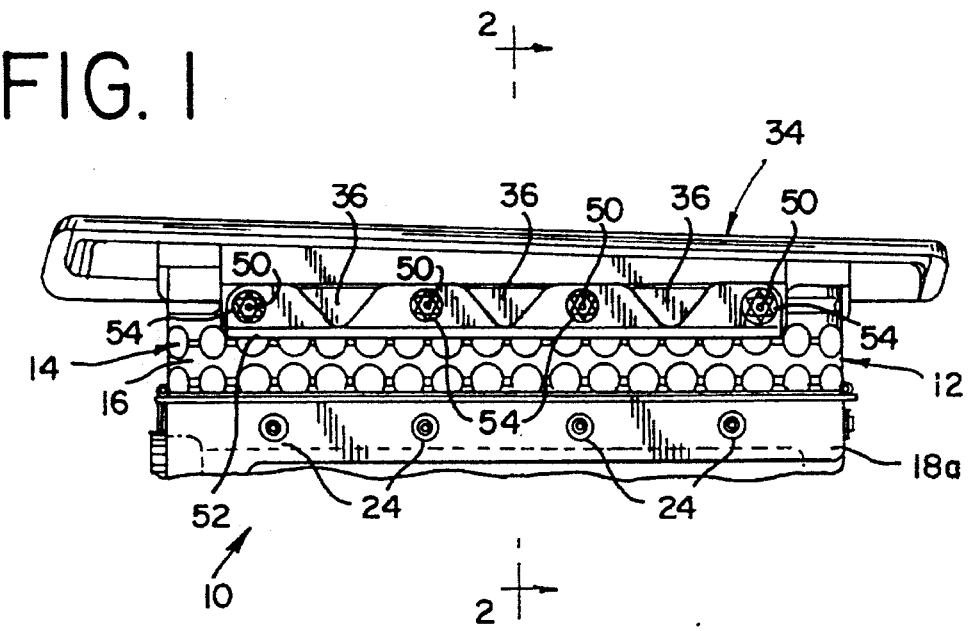
FIG. 1 is a front elevational view of an upper portion of an assembled airbag inflator module constructed in accordance with features of the present invention.
Figure 2:
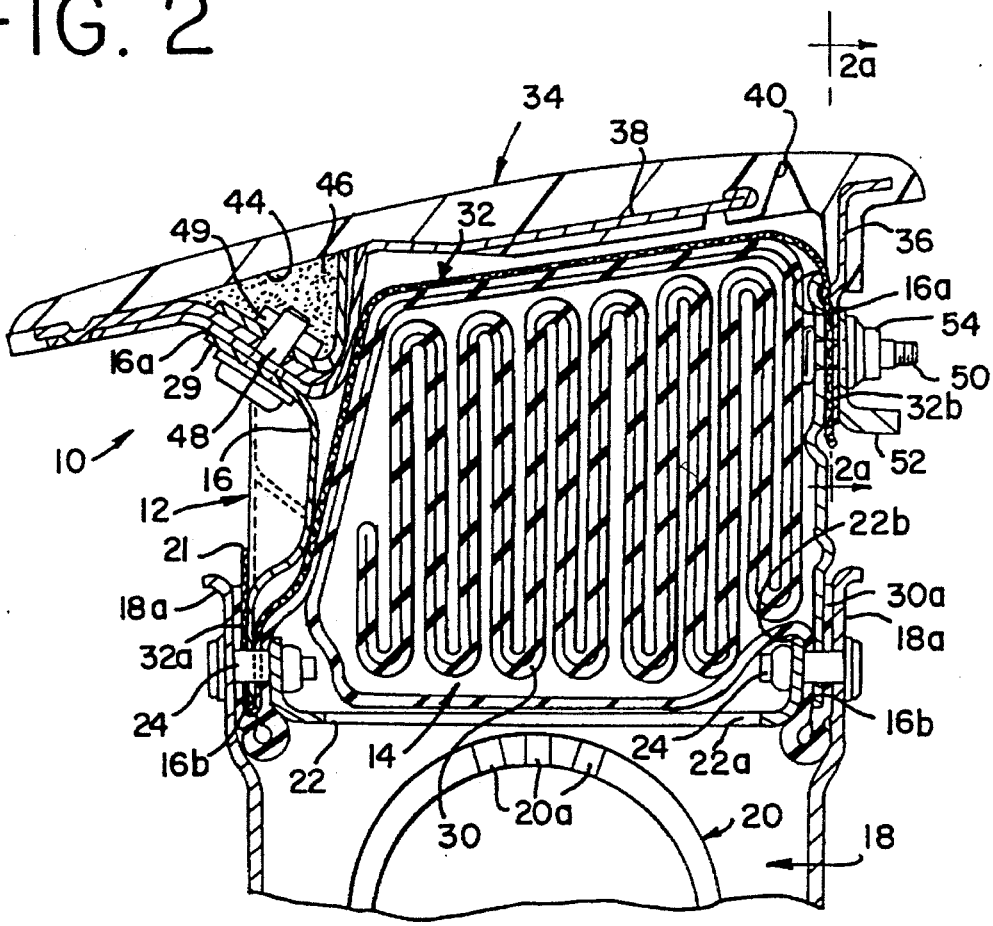
FIG. 2 is a cross-sectional view taken substantially along lines 2—2 of FIG. 1.
Figure 3:
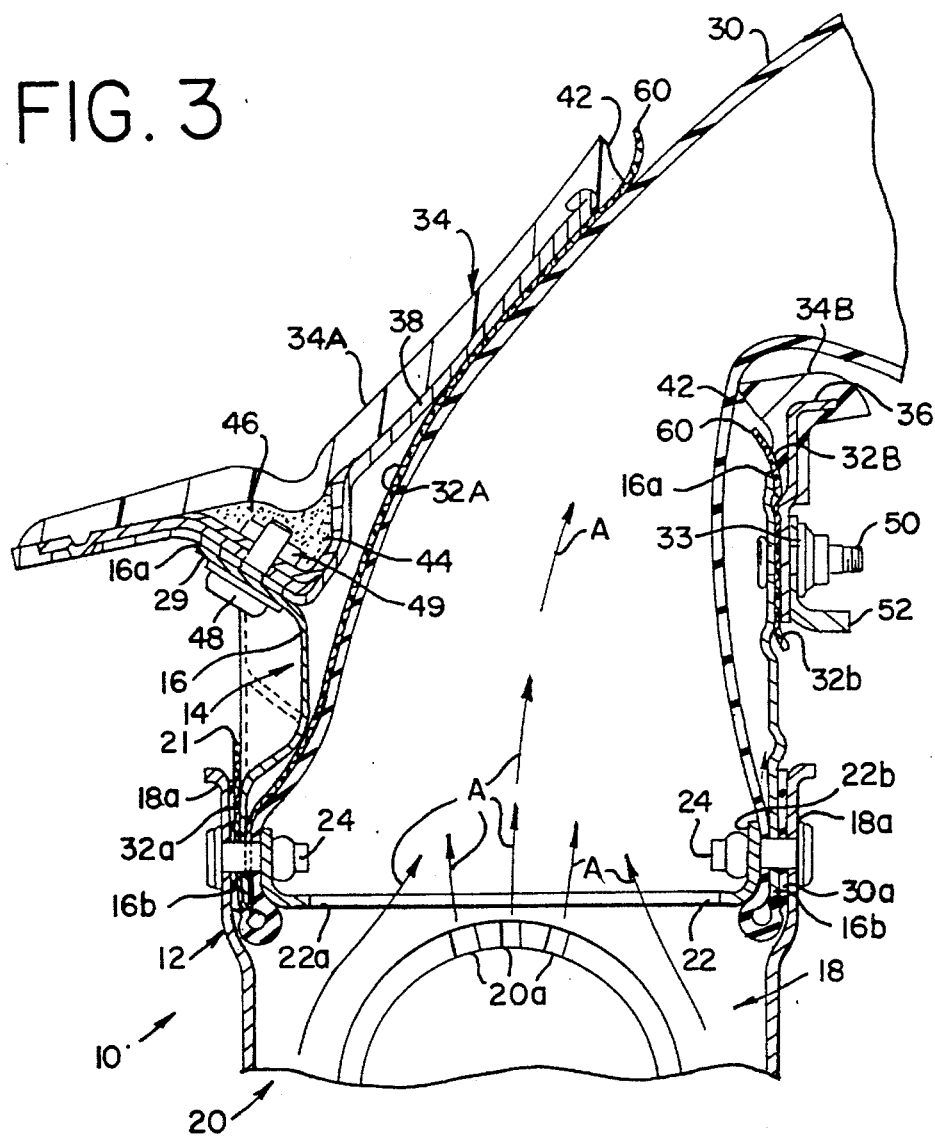
FIG. 3 is a cross-sectional view similar to FIG. 2 but illustrating an airbag in an inflated condition during deployment.

Referring now more particularly to the drawings, in FIGS. 1-3, therein is illustrated a new and improved, fully assembled airbag inflator module 10, constructed in accordance with features of the present invention and generally similar to that shown and described in the aforementioned, copending U.S. patent applications incorporated herein by reference.

The airbag assembly module 10 includes a housing 12 having a strong, airbag containing, upper retainer compartment 14 including a metal side wall 16 open at an upper end 16a and connected at a lower end portion 16b to an upper end portion 18a of a lower, retainer compartment 18, also formed of metal and adapted to hold and contain an inflator assembly 20. A mid-level, metal divider panel 22 formed of metal and provided with a plurality of transverse slots 22a spaced apart along the length thereof is secured in place between the upper and lower compartments 14 and 18 of the airbag module 10. The divider panel 22 is formed with an upstanding peripheral edge flange 22b in juxtaposition inside the lower end portion 16b of the side wall of the housing 16.

When the airbag inflator 20 is activated, gas generated thereby flows rapidly out of wall ports 20a therein and moves upwardly as indicated by the arrows A in FIG. 3 to inflate and deploy an airbag 30 formed of woven fabric sheet material. An open lower end portion 30a of the airbag 30 is doubled over and is sandwiched between the flange 22b, the upper end portion 18a of the lower retainer compartment 18, and the lower end portion 16b of the upper retainer compartment housing 16.

Figure 4:
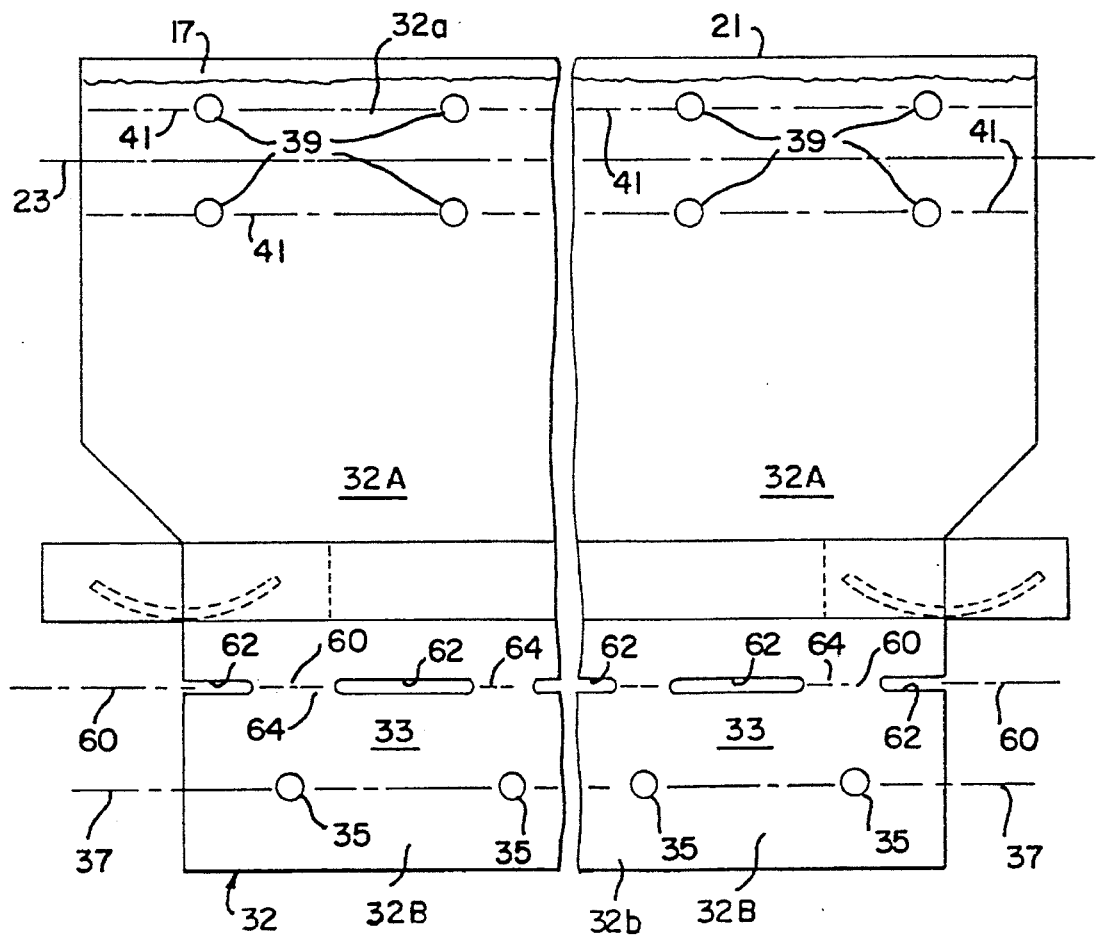
FIG. 4 is a plan view of a break-away, airbag retaining flap in accordance with features of the present invention before assembly into the airbag inflator module.

In accordance with the present invention, a lower end portion 32a extending along a lower edge 21 of a break-away airbag retaining flap 32 is secured (preferably by sewing or stitching along a line 17—FIG. 4) to one side of the lower end portion 30a of the airbag 30 adjacent the lower end portion 16b of the upper housing wall 16. As shown in FIGS. 2-4, the edge portion 32a is folded or doubled over along a fold line 23, to strengthen the edge portion. As more fully described in the aforementioned copending U.S. patent application Ser. No. 08/101,617, the retainer housing end portions 16b, 18a, the flange 22a, the end portion 30a of the airbag 30 and the left hand (FIGS. 2 and 3) lower edge 32a of the break-away airbag retaining flap 32 are firmly secured together by a row of fasteners 24 (such as pop-rivets or the like) at spaced apart intervals around the periphery of the airbag module 10 at a mid-level thereon. However, on a right hand or rearwardly facing side of the airbag module 10 (FIGS. 2 and 3), an edge portion of the break-away airbag retaining flap 32 is not present between the sandwiched end portions and flanges of the structure. This arrangement leaves an opposite or free edge portion 32b of the retaining flap 32 available to be secured to an upper end portion of the housing side wall 16 after the airbag 30 is placed in the housing while in a deflated, folded-up condition as illustrated in FIG. 2.

Referring momentarily to FIG. 4, the break-away air bag retaining flap 32 is formed in the general shape as shown and is made of a woven fabric constituting a thin, strong, sheet or piece of material such as NYLON$_R$ resinous plastic fibres woven to have a rating of 420 Denier. The flexible material of the retaining flap 32 is coated with silicones and thus becomes gas impermeable but flexibility and strength is still retained.

The airbag module 10 includes a separate cover 34 formed of molded resinous plastic material reinforced with an embedded metal stiffener 36 along a rearward edge portion and a main body stiffener 38 of metal forwardly thereof. As more fully described in the aforementioned copending U.S. patent application Ser. No. 08/101,609, upon deployment and rapid inflation of the airbag 30, the cover 34 is fractured along a thin portion defined by a groove 40 on the underside comprising a fracture line 42 (FIG. 3) and after fracture occurs a main body portion 34A of the cover is pivoted to open upwardly in a counterclockwise direction by pressure exerted from the expanding rapidly filling airbag 30. As the cover 34 opens, pivotal action occurs along a hinge line or region 44 adjacent a hollow chamber on the inside of the cover 34 that is filled with cellular foam 46. The larger metal body stiffener 38 bends as cover opening occurs but the stiffener is strong enough to remain intact and to retain the main body portion 34A (FIG. 3) of the cover 34 in an attached condition secured to a sloping flange 29 on the upper end portion 16a of the housing wall 16. A forward end portion of the main body portion 34A of the cover is secured to the housing 16 by means of threaded fasteners 48 and nuts 49. Engagement of the fasteners 48 and the nuts 49 occurs at the time the cover 34 is assembled for finally closing off and sealing the upper end of the upper retainer compartment 14 of the airbag module 10.

During assembly of the module 10 and prior to attachment of the cover 34 to close off the upper end of the housing 16, the airbag 30 is placed in a folded-up, deflated condition in the chamber 14 as illustrated in FIG. 2 with the lower end portion 30a of the airbag and an edge portion 32a of the retaining flap 32 secured by the rivets 24 to the adjacent end portion and flanges of the housing structure. In order to positively retain, protect and contain the folded-up airbag 30 within the upper retainer compartment 14, the flexible fabric tear-away retaining flap 32 is extended to overlie and cover over the airbag 30 to prevent crimping, pinching or other damage which might affect operational reliability when the cover 34 is attached in place as a final step of the assembly process.

As shown in FIGS. 2 and 3, a right hand upper end portion 16a of the housing wall 16 is provided with a plurality of outwardly extended fasteners 50 having headed inner ends welded or otherwise secured against rotation with respect to the inside surface of the housing wall. The outwardly extending shanks of this upper row of fasteners 50 are positioned at spaced apart intervals along an upper level on the housing 16 above the line of pop-rivets 24. The upper row of fasteners 50 serve to attach a rearwardly extended portion 34B of the cover 34 to support and secure the stiffener 36 thereof in place when the cover 34 is finally attached.

Prior to attachment of the cover 34, a tab portion or flange portion 33 along the edge 32b of the break-away fabric retaining flap 32 is pulled over the fasteners 50 until spaced apart holes or apertures 35 along an attachment line 37 on the flange portion 33 are in alignment with shanks of the respective fasteners 50. Along the opposite edge portion 32a of the retaining flap 32 that is sewn onto the airbag 30, a plurality of spaced apart holes or apertures 39 have been provided along an opposite attachment line 41 adjacent the lines of stitches 17 (FIG. 4) for accommodating the pop-rivets 24 when the edge portion 32a was previously secured to the lower end portion 16a of housing 16 along with the airbag 30 as described hereinbefore.

It will thus be seen that the tear-away airbag retaining flap 32 keeps the folded-up airbag 30 in place in the upper housing 14, until and after the cover 34 is attached. The stiffener 36 of the cover 34 is provided with holes spaced apart to accommodate the upper row of fasteners 50 and similarly, the stiffener 38 is provided with a row of spaced apart holes aligned with the nuts 49 in the hollow void 44 of the cover 34 so that the cap screws 48 may engage the nuts during final assembly of the airbag module 10 to secure a forwardly extending flange portion of the cover 34 to the housing 16. An external stiffener bar 52 of angular transverse cross-section is similarly provided with spaced apart holes or apertures to accommodate the shanks of the upper row of fasteners 50 and the bar 52 is assembled into place over the retaining flap 32 and stiffener element 36 by nuts 54.

During the time of assembly of the airbag module 10, after the folded-up deflated airbag 30 with the retaining flap 32 attached thereto has been placed in the upper compartment 14, the tear-away or break-away airbag retaining flap 32 positively retains the airbag in place and protects the airbag from pinching or binding against the cover 34 or upper portions of the inside housing wall 16 during cover attachment.

Figure 2A:
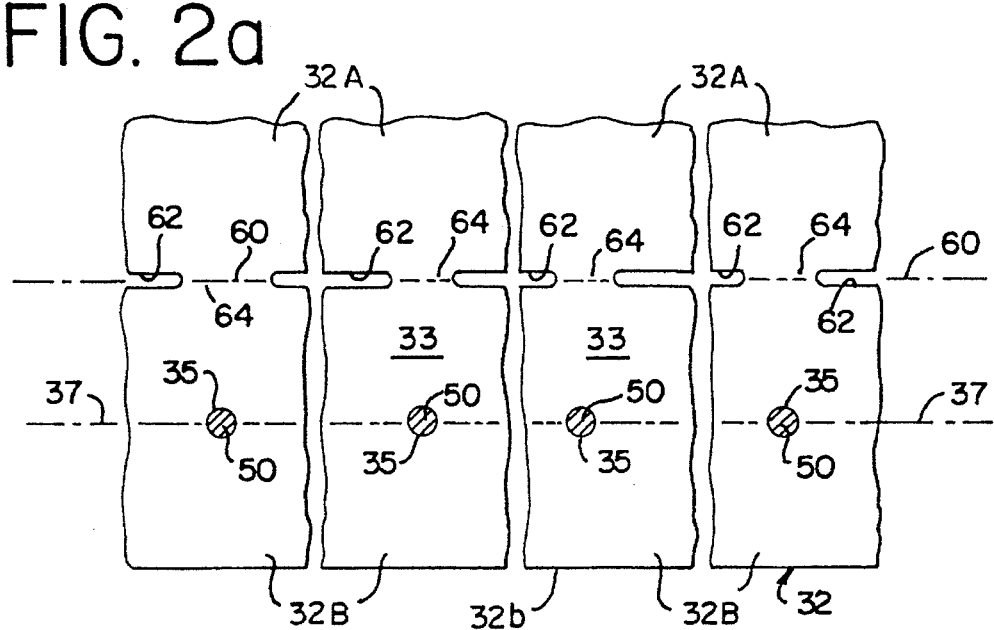
FIG. 2a is a fragmentary, cross-sectional view taken substantially along lines 2a—2a of FIG. 2, illustrating an attachment edge portion of a break-away retaining flap in accordance with features of the present invention.

Referring to FIGS. 2a and 4, the airbag retaining flap 32 is formed with a weakened section of reduced cross-sectional area along a tear-away or break-away line 60, which line is generally parallel of the edge fastening line 37 and spaced intermediately between. The break-away line 60 is formed by a plurality of spaced apart openings or holes 62 formed in the fabric material to leave webs 64 therebetween of relatively narrow width and reduced cross-sectional area between adjacent pairs of holes 62. The holes or slots 62 thus serve to facilitate fracture or break-away of the retaining flap 32 into two parts comprising a large part 32A (FIG. 3) and a narrower part 32B on opposite sides of the break-away line 60. The webs 64 of the retaining flap 32 are sized to be strong enough to retain the airbag 30 in place but are not so strong as to offer substantial resistance to the airbag 30 as it is filled with expanding gas upon airbag deployment. As the airbag 30 inflates, the retaining flap 32 tears readily along the break-away or tear line 60 and does not impede the rapid inflation of the expanding airbag 30.

After the fracture occurs along the break-away line 60, part 32A of the retaining flap 32 is retained on the left side wall of the housing 16 (FIG. 3) and part 32B is retained on the right side wall, thus preventing any fragments of the severed retaining flap 32 from becoming a projectile during bag deployment which could prove injurious to a person in the vehicle. These retained parts 32A and 32B of the fractured break-away retaining flap 32 serve to guide and protect the inflating airbag 30 against friction damage during the rapid expansion process. The retaining flap parts 32A and 32B also protect adjacent vehicle instrument panel surfaces from frictional damage during airbag deployment.

Figure 5:
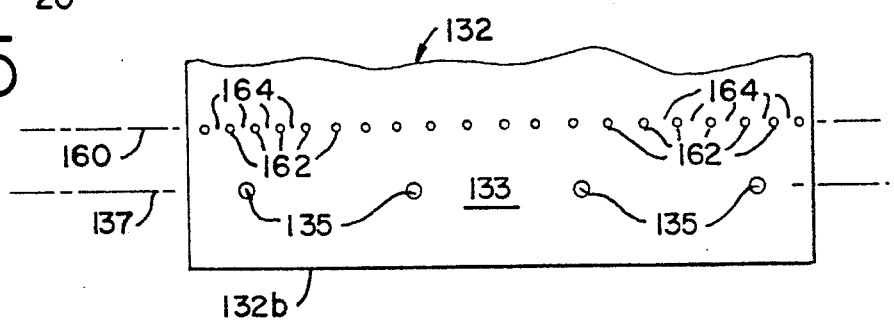
FIG. 5 is a fragmentary plan view of a modified form of an attachment edge portion of a break-away airbag retaining flap in accordance with features of the present invention.

Referring to FIG. 5, therein is illustrated a modified form of break-away airbag retaining flap 132 having an attachment edge 132b and tab portion 133 provided with spaced apart holes 135 at intervals along an attachment line 137 for accommodating the upper row of fasteners 50. The fabric retaining flap 132 includes a row of small round perforations 162 spaced at relatively close intervals along a break-away or tear-away line 160. Fracture of the retaining flap 132 during airbag deployment occurs along the line 160 across relatively narrow web portions 164 of greatly reduced width and cross-sections formed between adjacent pairs of the small round holes 162 similar to the manner in which a string of common postage stamps are separated from one another by tearing along a line of small perforations.

Figure 6:
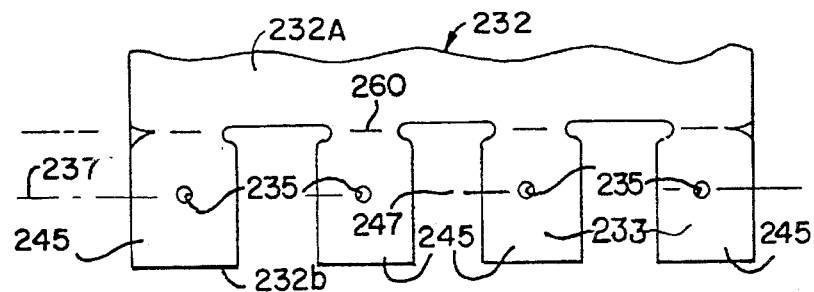
FIG. 6 is a fragmentary plan view of yet another modified form of an attachment edge portion of a break-away airbag retaining flap in accordance with features of the present invention.

Referring to FIG. 6, therein is illustrated another modified form of a break-away airbag retaining flap 232, having a plurality of spaced apart tabs 245 along an attachment edge 232b. Each tab 245 is formed with an aperture 235 in a central location for accommodating a fastener 50 and the apertures are appropriately spaced at intervals along a common attachment line 237. A tear-away or break-away line 260 is formed extending along the base of each tab 245 at the region of joinder with a main part 232A of the retaining flap 232. The individual tab 245 facilitates placement of a tab portion 233 of the retaining flap 232 on the individual shanks of the fasteners 50, and open spaces 247 formed between adjacent tab 245 provide a sufficient weakening and reduction of cross-section along the tear-away line 260 to facilitate severance along the line as the airbag 30 is deployed.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. In an airbag inflator module, the combination, including:

a rigid housing for holding an inflatable airbag while in a deflated folded condition, said housing having an open end for permitting said airbag to escape upon deployment thereof;

a cover attached to said housing with fastening means to enclose said open end for normally containing said deflated folded airbag, said cover designed to break along a predetermined fracture line to pivot open along a hinge line when said airbag is inflated upon deployment; and a break-away retaining flap of thin flexible sheet material extending over said airbag adjacent said open end for retaining said folded deflated airbag in said housing while said cover is attached to said open end, said retaining flap having a first part secured to said housing at a position within said housing and spaced away from said open end and a second part secured to said fastening means.

2. The combination of claim 1, wherein:

said retaining flap includes a second part having at least one opening therein adapted to fit over said fastening means, and including a weakened portion between said first and second parts adapted to break and release retention of said airbag upon inflation thereof.

3. The combination of claim 2, wherein:

said weakened portion comprises a plurality of perforations spaced apart along a line to facilitate break-away along said line when said airbag is inflated.

4. The combination of claim 2, wherein:

said weakened portion comprises a plurality of elongated perforations in spaced apart end to end relation defining a line of break-away when said airbag is inflated.

5. The combination of claim 1, wherein:

said break-away retaining flap is formed of woven fabric.

6. The combination of claim 2, wherein:

said first part of said retaining flap is attached to said airbag.

7. The combination of claim 6, wherein:

said retaining flap is attached to said airbag by one or more rows of stitching.

8. A break-away retaining flap for containing a deflated, folded airbag in a rigid housing while a pivotable cover is being attached to said housing with fasteners in order to cover an open end of said housing with said airbag therein, comprising:

a piece of thin flexible sheet material having means on a first portion for attachment within said housing and away from said open end and means on a second portion for securing to said fasteners while said cover is attached, said piece of sheet material having a weakened portion between said first and second portions adapted to facilitate break-away of said retaining flap into at least two parts when said airbag is inflated.

9. The break-away retaining flap of claim 8, wherein:

said second portion comprises a plurality of spaced apart openings for receiving said fasteners to retain said airbag in place in said housing while said cover is attached.

10. The break-away retaining flap of claim 9, wherein:

said openings are spaced along a fastening line; and wherein said weakened portion comprises a plurality of perforations spaced apart along a break-away line between said first and second portions.

11. The break-away retaining flap of claim 10, wherein:

said weakened portion comprises webs of reduced strength formed between adjacent perforations to facilitate break-away along said break-away line.

12. A break-away retaining flip for containing a deflated, folded airbag in a rigid housing while a pivotable cover is being attached to said housing with fasteners in order to cover an open end of said housing with said airbag therein, comprising:

a piece of thin flexible sheet material having means on a first portion for attachment to said housing away from said open end and a second portion adapted to be secured to said fasteners while said cover is attached, said piece of sheet material having a weakened portion between said first and second portions adapted to facilitate break-away of said retaining flap into at least two parts when said airbag is inflated;

said second portion comprising a plurality of spaced apart openings for receiving said fasteners to retain said airbag in place in said housing while said cover is attached; and wherein said spaced apart openings are formed in spaced apart parallel tabs defining open spaces therebetween extending between said weakened portion and said second portion.

13. The break-away retaining flap of claim 12, wherein:

said tabs have an outer end forming a free edge of said retaining flap to facilitate placing said retaining flap over said airbag with said fasteners extended into said openings of said tabs.

14. A method of assembling a deflated, folded-up airbag into a rigid housing of an airbag inflator module having a cover on an open end of said housing, which cover is fractured to pivot open when said airbag is inflated during deployment, comprising the steps of:

securing a first portion of a flexible, break-away, airbag retaining flap to a wall within said housing at a position spaced away from said open end;

placing said airbag in a deflated, folded-up condition in said housing;

extending said retaining flap to cover over said airbag in said housing to protect the same;

securing a second portion of said retaining flap to said housing; and attaching said cover over said open end of said housing.

15. The method of claim 14, wherein:

fasteners are utilized for attaching said cover onto said housing; and said securing second portion of said retaining flap to said fasteners.

16. The method of claim 15, including:

providing said fasteners extending outwardly of said housing and holding said second portion of said retaining flap in covering position over said folded-up airbag placed in said housing by said fasteners projecting into openings in said second portion of said retaining flap.

17. The method of claim 14, wherein:

securing said airbag along with said first portion of said retaining flap to said wall of said housing at said position away from said open end.

18. The method of claim 14, wherein:

securing said retaining flap seals off said open end of said housing for protecting said airbag from contact with said cover when said cover is attached to said housing.

19. The method of claim 14, including the step of:

forming a weakened area in said retaining flap between said first and second portions to facilitate the break-away of said retaining flap into separate parts along said weakened area when said airbag is inflated upon deployment thereof.

20. The method of claim 14, including the step of:

attaching said first portion of retaining flap to said airbag.

21. The method of claim 20, wherein:

attaching of said retaining flap to said airbag along an edge portion of an open end thereof.

22. The method of claim 21, wherein:

securing of said retaining flap to said airbag by stitching.

23. A method of assembling a deflated, folded-up airbag into a rigid housing of an airbag inflator module having a cover on an open end of said housing, which cover is fractured to pivot open when said airbag is inflated during deployment, comprising the steps of:

securing a first portion of a flexible, break-away airbag retaining flap to a wall within said housing at a position spaced away from said open end;

placing said airbag in a deflated folded-up condition in said housing;

extending said retaining flap to cover over said airbag in said housing to protect the same;

securing a second portion of said retaining flap to said housing using fasteners which extend outwardly from said housing and project into openings in said second portion of said retaining flap to secure and hold the same in a covering position over said folded-up airbag in said housing; and attaching said cover over said open end of said housing using said fasteners after said step of securing the second portion of said retaining flap to said housing.

\* \* \* \* \*